United States Patent [19]

Pivetta

[11] Patent Number: 4,725,132
[45] Date of Patent: Feb. 16, 1988

[54] BEZEL CLOSURE DEVICE PARTICULARLY FOR EYEGLASSES FRAMES

[75] Inventor: Innocente Pivetta, S. Vito di Valdobbiadene, Italy

[73] Assignee: Celes Optical S.r.l., Pederobba, Italy

[21] Appl. No.: 726,445

[22] Filed: Apr. 23, 1985

[30] Foreign Application Priority Data

May 2, 1984 [IT] Italy ................. 59334/84[U]

[51] Int. Cl.⁴ ................................. G02C 1/08
[52] U.S. Cl. .......................... 351/90; 351/98
[58] Field of Search ................... 351/90–102

[56] References Cited

U.S. PATENT DOCUMENTS 1,306,527 6/1919 Day ....................... 351/96
2,412,120 12/1946 Bouchard ............... 351/141
4,277,151 7/1981 Schönhut ............. 351/90 X

FOREIGN PATENT DOCUMENTS 525608 5/1956 Canada ..................... 351/90

Primary Examiner—Rodney B. Bovernick
Attorney, Agent, or Firm—Guido Modiano; Albert Josif

[57] ABSTRACT

The bezel closure device comprises bezel tube halves rigid with the ends of a metal bezel. The tube halves define contiguous bases adapted to contact each other to close the bezel. Each tube half includes a throughgoing hole, which is threaded internally to receive a screw, including a shank, formed with threads at a lower portion thereof. A spring washer prevents the screw from becoming loose in the throughgoing hole.

7 Claims, 10 Drawing Figures

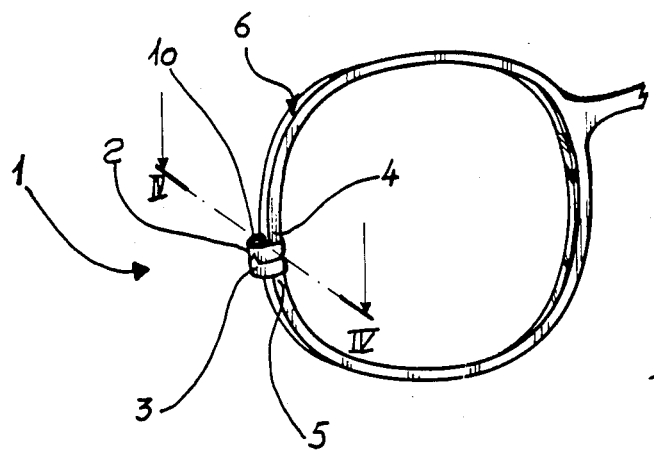
Fig. 1
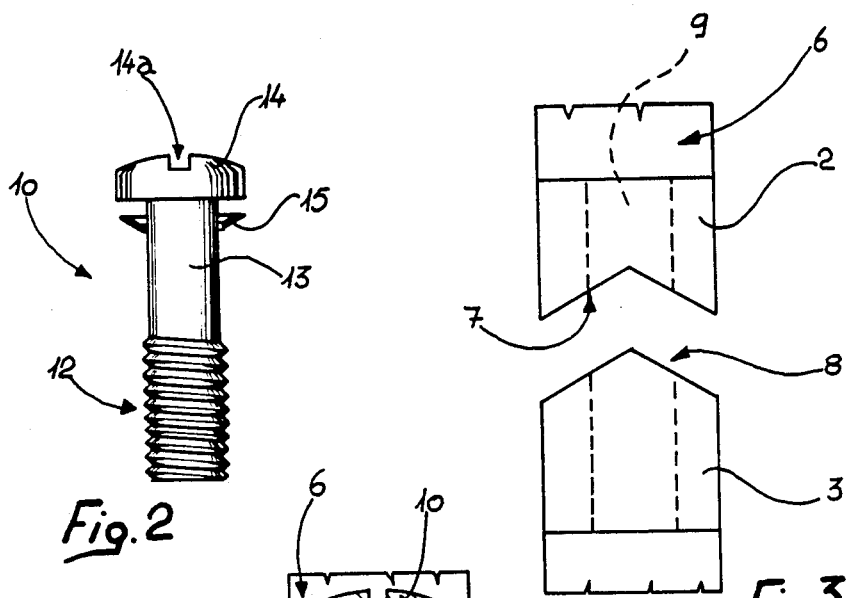
Fig. 2
Fig. 3
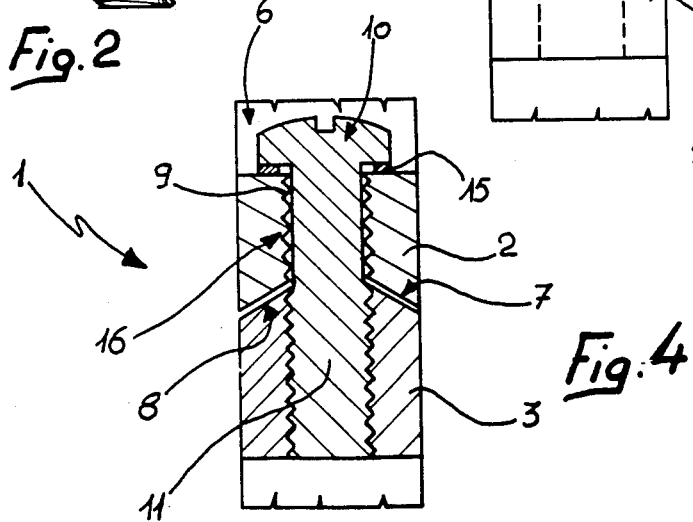
Fig. 4

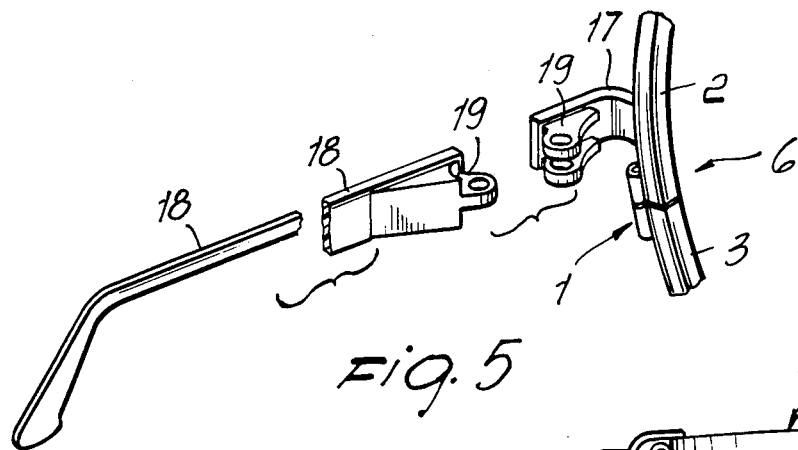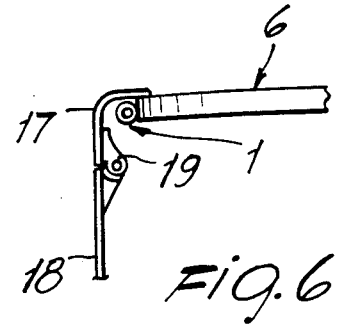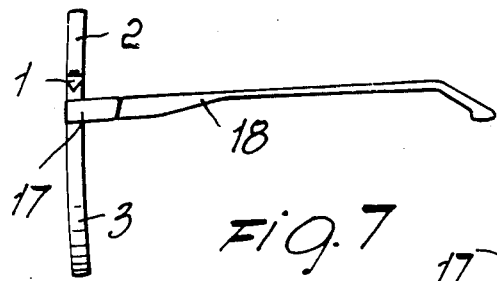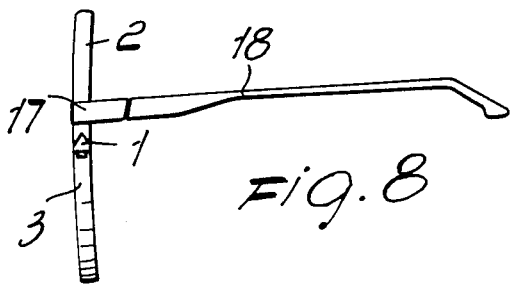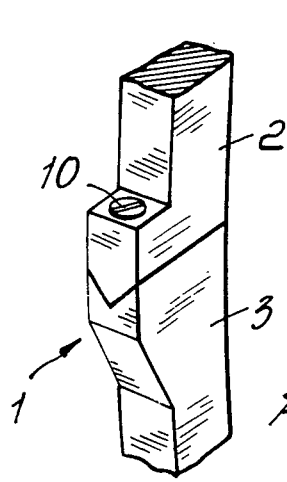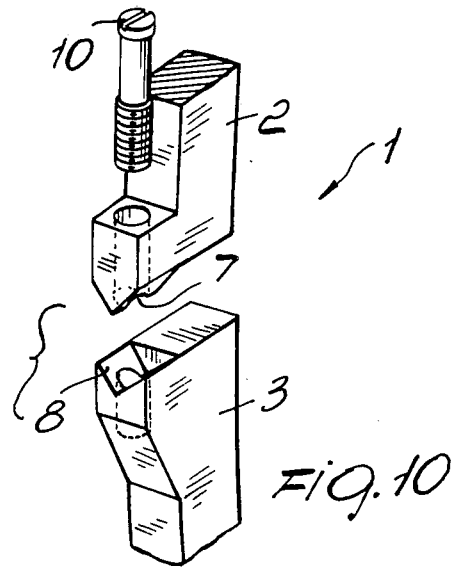

BEZEL CLOSURE DEVICE PARTICULARLY FOR EYEGLASSES FRAMES

BACKGROUND OF THE INVENTION

This invention relates to a bezel closure device, particularly for eyeglasses frames.

Metal frames for eyeglasses have long been available; these usually comprise a pair of wire elements or bezels, formed with a groove for receiving the lenses and being closed into a ring to provide a seat therefor.

Closure of each ring is provided by a screw engaging with the opposed end of the metal element, one of which has a threaded hole therein and the other a throughgoing hole.

This technique has some disadvantages, such as the difficulty of aligning the throughgoing hole with the threads during the assembling step, which alignment is made more awkward by the minute size of the components.

Further, during the assembling step, such as where a lens is to be replaced, the screw may be lost consequently to it becoming disengaged from the threads, since it is in no way held in the frame and is at the same time thrown away by the elastic recovery of the metal element, which causes the bezel to snap open.

SUMMARY OF THE INVENTION

It is an object of this invention to provide a closure device for metal elements forming eyeglasses bezels, which is unaffected by the problems set forth hereinabove.

In particular, it is an object of this invention to provide a closure device which can retain the screw captively therein once the bezel is open.

A further object of the invention is to provide a closure device which ensures a quick and accurate tightening action.

These and other objects, such as will be apparent hereinafter, are achieved, according to the invention, by a bezel closure device, particularly for eyeglasses frames, characterized in that it comprises a part-threaded tightening screw associable with first and second bezel tube halves, being both inside threaded and having contiguous mating ends counter-shaped for guided engagement, a locking means being provided between the screw head and one bezel tube half.

BRIEF DESCRIPTION OF THE DRAWINGS

The invention will be further described, by way of example and not of limitation, in the accompanying drawings, where:

FIG. 1 is a three-quarter view of a bezel for eyeglasses frames;

FIG. 2 is a view of the tightening screw with the washer in cross-section;

FIG. 3 is a front view of the two bezel tube halves in an open condition;

FIG. 4 is a sectional view taken in the plane IV—IV of FIG. 1;

FIG. 5 is a fragmentary, perspective view of the bezel closure device as applied to eyeglasses frames;

FIG. 6 is a plan view of the bezel closure device as applied to eyeglasses frames; and FIG. 7 to 10 illustrate further embodiments of the invention.

DESCRIPTION OF THE PREFERRED EMBODIMENTS

Making reference to the accompanying drawing figures, it may be seen that the closure device 1 of this invention comprises two rib members defining bezel tube halves or tube halves 2 and 3, respectively an upper one and lower one. The tube halves 2 and 3 are rigid with the ends 4 and 5 of the metal bezel or rims 6, the lens receiving seat. In particular, as visible, each rim is conformed to surround and support an eyeglass lens and has first and a second mutually mating rim ends. In detail, the rib members 2, 3 have a substantially parallelepipedal shape with first outer bases 30, 31 and second abutment bases 7, 8.

It is envisaged that the abutment contiguous base 7 and 8, belonging to the tube halves 2 and 3, are matingly shaped and contact each other to close the bezel. Advantageously, one of the bases, such as the base 8, belonging to the bezel half 3, is machined to a frusto-conical shape or a prismatic shape with triangular cross-section which protrudes for coupling with the correspondingly counter-shaped base 7 the mating shapes of bases 7, 8 defining alignment guiding means for mutual axial alignments of the rib members.

Both tube halves have a respective throughgoing hole 9, which is threaded internally to receive a tightening screw 10. The threaded holes 9 extend in alignment to each other in the mutual axially aligned condition of the rib members and have substantially the same diameter. The screw 10 has a shank 11 the lower portion whereof is threaded at 12, whilst at the upper portion 13, associated with the head 14, the thread 12 is stubbed off. The head 14 may have a longitudinal slot 14a or a cross one.

A spring washer 15 is slipped, over the thread 12, over the part 13 and prevents, once the screw is tightened, the screw 10 from coming loose. The taper of the bases 7 and 8 of the tube halves provides for a reliable alignment of the two parts of the hole 9 formed in the tube halves themselves.

Furthermore, during the frame disassembling operations, e.g. to replace a lens, the screw 10 is left engaged with the threads 16 formed on the inside of the hole 9 in the tube half 2, even after the bezel 6 is opened, thus avoiding that it may drop and be lost.

Advantageously, a small bracket-like member 17 may be rigidly associated with a tube half at each side of a pair of eyeglasses frames, proximately to the bezel 6 closure devices 1 associated therewith. The side arm elements 18 of the eyeglasses frames may then be hinged to the bracket-like members 17, to permit the side arm elements 18, to be rotated about their hinge connections 19 to lie substantially parallel to the bezels 6, in a manner known per se.

Further embodiments of the invention are clearly illustrated in drawing FIGS. 6 to 10. While the materials may vary, in accordance with specific needs or requirements, it is preferred that the bezel halves be made of nickel silver.

The screw would be generally of steel.

As may be appreciated the invention brilliantly achieves the objects set forth, permitting a quick closure of the bezel, and ensuring at the same time that the screw is withheld during the assembling step, thus avoiding that it may be lost or dropped, the spring washer also ensuring a reliable lock.

I claim:

1. An eyeglass frame comprising:
   a pair of lens supporting rims, each of said lens supporting rims being conformed to surround and support an eyeglass lens and having first and a second mutually mating rim ends;
   a first rib member rigid with said first rim end;
   a second rib member rigid with said second rim end, said rib members having a substantially parallelepipedal shape with a first outer base and a second abutment base, said abutment bases of said first and second rib members being matingly shaped and having alignment guiding means for mutual axial alignment of said rib members, said first and second rib members having axial threaded holes extending in alignment to each other in a mutual axially aligned condition of said rib members and having substantially the same diameter and, respectively, first and second threaded hole lengths,
   a tightening screw having an enlarged screw head and a narrower screw shaft for insertion in said axial threaded holes of said rib members, said screw shaft having a first substantially smooth portion adjacent to said screw head and a second threaded portion adjacent to said first smooth portion for engaging with said axial threaded hole of said second rib member, said threaded portion of said tightening screw having a length at the most equal to said second threaded hole length, thereby said threaded portion of said tightening screw, in a mutual tightened condition of said rib members, engaging only with said second axial threaded hole, drawing said screw head in abutment against said first rib member and tightening said first and second rib members against each other,
   locking means arranged between said screw head and said first rib member for preventing said screw from loosening in said mutual tightened condition of said rib members, and
   screw engagement means in said first rib member, including said axial threaded hole of said first rib member, thereby, when said screw is unscrewn from said second rib member, said screw remaining in engagement with said first rib member and being prevented to be lost.

2. The frame according to claim 1, wherein said abutment bases of said first and second rib members have mating prismatic shapes with triangular cross-sections defining said alignment guiding means.

3. The frame according to claim 1, wherein said locking means comprises a metal spring washer arranged between said screw head and said first outer base of said first rib member, said metal spring washer having an outside diameter greater than said axial threaded holes in said rib members.

4. The frame according to claim 1, wherein said rib members are of nickel silver.

5. The frame according to claim 1, wherein said tightening screw is of steel.

6. An eyeglass frame comprising:
   a pair of lens supporting rims, each of said lens supporting rims being conformed to surround and support an eyeglass lens and having first and a second mutually mating rim ends;
   a first rib member rigid with said first rim end;
   a second rib member rigid with said second rim end, said rib members having a substantially parallelepipedal shape with a first outer base and a second abutment base, said abutment bases of said first and second rib members being matingly shaped and having alignment guiding means for mutual axial alignment of said rib members, said first and second rib members having axial threaded holes extending in alignment to each other in a mutual axially aligned condition of said rib members and having substantially the same diameter and, respectively, first and second threaded hole lengths,
   a tightening screw having an enlarged screw head and a narrower screw shaft for insertion in said axial threaded holes of said rib members, said screw shaft having a first substantially smooth portion adjacent to said screw head and a second threaded portion adjacent to said first smooth portion for engaging with said axial threaded hole of said second rib member, said smooth portion of said tightening screw having a length at least equal to said first threaded hole length, thereby said threaded portion of said tightening screw, in a mutual tightened condition of said rib members, engaging only with said second threaded hole, drawing said screw head in abutment against said first rib member and tightening said first and second rib members against each other;
   screw engagement means in said first rib member, including said axial threaded hole of said first rib member, and
   locking means including a spring washer arranged between said screw head and said first outer base of said first rib member. said metal spring washer having an outside diameter greater than said axial threaded holes of said rib members for friction preventing said screw from loosening in said mutual tightened condition of said rib members, thereby, when said screw is unscrewn from said second rib member, said screw remaining in engagement with said first rib member and being prevented to be lost.

7. An eyeglass frame comprising:
   a pair of lens supporting rims, each of said lens supporting rims being conformed to surround and support an eyeglass lens and having first and a second mutually mating rim ends;
   a first rib member rigid with said first rim end;
   a second rib member rigid with said second rim end, said rib members having mutually facing engagement surfaces, said engagement surfaces of said rib members being matingly shaped and having alignment guiding means for mutual axial alignment of said rib members, said first and second rib members having, respectively, first and second axial threaded holes extending in alignment to each other in a mutual axially aligned condition of said rib members and having substantially the same diameter,
   a tightening screw having an enlarged screw head and a narrower screw shaft for insertion in said axial holes of said rib members, said screw shaft having a first substantially smooth portion adjacent to said screw head and a second threaded portion adjacent to said first smooth portion of engaging with said second axial threaded hole of said second rib member, said smooth portion of said tightening screw having such a length that, in a mutual tightened condition of said rib members, said threaded portion engages only in said second axial threaded hole, screw loss preventing means including said smooth portion of said tightening screw and said first threaded hole of said first rib member, locking means including a spring washer arranged between said screw head and said first outer base of said first rib member; said metal spring washer having an ouside diameter greater than said axial threaded holes of said rib members for friction preventing said screw from loosening in a mutual tightened condition of said rib members, thereby, when said threaded portion of said screw is unscrewn from said second axial threaded hole of said second rib member, said screw remaining in engagement with said first rib member with said smooth portion thereof extending in said first axial threaded hole and said threaded portion thereof protruding from said first axial threaded hole and said screw being prevented to be lost.

* * * * *